United States Patent
Nakamura

(10) Patent No.: US 7,839,754 B2
(45) Date of Patent: Nov. 23, 2010

(54) OPTICAL HEAD AND OPTICAL DISK DEVICE

(75) Inventor: Yuichi Nakamura, Kawasaki (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 1362 days.

(21) Appl. No.: 11/317,023

(22) Filed: Dec. 27, 2005

(65) Prior Publication Data

US 2006/0193215 A1 Aug. 31, 2006

(30) Foreign Application Priority Data

Dec. 28, 2004 (JP) ............................. 2004-381993

(51) Int. Cl.
*G11B 7/00* (2006.01)
(52) U.S. Cl. ............... 369/121; 369/112.07; 369/44.23; 369/112.05; 369/44.24
(58) Field of Classification Search ................. 369/121, 369/112.03, 124.03, 44.14, 44.37, 112.01, 369/13.28, 13.34, 44.23, 110.02, 110.03
See application file for complete search history.

(56) References Cited

U.S. PATENT DOCUMENTS

2004/0233821 A1 11/2004 Saitoh et al.

2005/0122883 A1* 6/2005 Kimura .................. 369/112.05
2005/0226124 A1* 10/2005 Kimura et al. .......... 369/112.08

FOREIGN PATENT DOCUMENTS

| JP | 10-208267 | 7/1998 |
|---|---|---|
| JP | 11-306581 | 5/1999 |
| JP | 2001-291259 | 10/2001 |
| JP | 2002-197717 | 12/2002 |

* cited by examiner

*Primary Examiner*—Wayne R Young
*Assistant Examiner*—Dionne H Pendleton
(74) *Attorney, Agent, or Firm*—Oblon, Spivak, McClelland, Maier & Neustadt, L.L.P.

(57) ABSTRACT

An optical head includes a first laser diode configured to generate a laser beam with a wave length of $\lambda 1$, a second laser diode configured to generate a laser beam with a shorter wave length of $\lambda 2$ than the wave length $\lambda 1$, a collimator lens arranged so that the laser beams are incident on it, an aperture filter arranged on an optical axis of the collimator lens, and an object lens 0 arranged on the optical axis so that the laser beams passing through the aperture filter are incident on it, wherein the second laser diode is arranged at a position on the optical axis further away from collimator lens than the first laser diode is away from the collimator lens.

1 Claim, 6 Drawing Sheets

OPTICAL HEAD AND OPTICAL DISK DEVICE

CROSS-REFERENCE TO RELATED APPLICATIONS

This application is based upon and claims the benefit of priority under 35 U.S.C. §119 from the prior Japanese Patent Application No. 2004-381993, filed on Dec. 28, 2004, the entire contents of which are incorporated herein by reference.

BACKGROUND OF THE INVENTION

1. Field of Invention

The present invention relates to an optical head for recording and reading signals in a plurality of different kinds of optical recording media (optical disks) such as, for example, a CD (compact disk), a DVD (digital versatile disk), and to an optical disk device using the optical head. More particularly, the present invention relates to an optical head using a plurality of lights having different wavelengths.

2. Description of Related Art

Conventionally, an optical head is used for reading signals recorded in various kinds of optical recording media (optical disks), each of which has a protective layer of a different thickness and a different density of stored information. Laser beams having different wavelengths are used to record and reproduce information on different mediums.

In addition, a known optical head uses a light source module incorporating light emission units generating two laser beams having a short wavelength and a long wavelength, respectively, into one package by using an optical system common to every wavelength, which includes an object lens for reproduction. In an optical head commonly used for many kinds of media, it is necessary to install a light source for generating a plurality of lights having different wavelengths. For example, an optical head that functions to reproduce a signal from a DVD and to record a signal in a CD has a laser diode (LD) configured to generate light beams having wavelengths of 650 nm and 780 nm. In an optical head commonly used for many kinds of media, it is further necessary to use an object lens, which is commonly used for light sources that generate two different wavelengths. A special diffraction type object lens is used for such a purpose. The special diffraction type object lens focuses light from two light sources, which are placed at a same position on the optical axis to form images at different positions, respectively, on the optical axis (refer to Japanese Patent Disclosure 2003-272218).

In an optical head using a light source generating a plurality of light beams having different wavelengths the special double focus diffraction type object lens described above is used for removing a spherical aberration generated when light beams having different wavelengths are focused at different positions on the optical axis by the same lens. However, this special type of object lens has a complicated structure, which requires high manufacturing cost, which increases the price of the whole optical head.

Furthermore, the two-wave length LD cannot be used for the optical head, in which a general and inexpensive object lens is used. Therefore, it is necessary to install different laser beam sources and different optical systems corresponding to them. Then a problem arises that it is difficult to realize miniaturization of the optical head.

SUMMARY OF THE INVENTION

Therefore, the present invention was made to solve the aforementioned problems and is intended to provide an inexpensive and small optical head.

The optical head according to an embodiment of the present invention includes a first laser diode configured to generate a laser beam with a wavelength of $\lambda 1$; a second laser diode configured to generate a laser beam with a wavelength of $\lambda 2$, which is shorter than the wavelength $\lambda 1$; a collimator lens having an optical axis, the first laser diode and the second laser diode are configured to generate laser beams incident upon the collimator lens; and an object lens arranged on the optical axis of the collimator lens, wherein the second laser diode is arranged at a position on the optical axis that is further away from the collimator lens than the first laser diode is away from the collimator lens.

Furthermore, the above-described optical head may further include an aperture filter arranged on the optical axis of the collimator lens, wherein the first laser diode is configured to generate the laser beam with wavelength $\lambda 1$ that passes through the collimator lens and aperture filter, and is incident on the object lens as diffused light, and the second laser diode is configured to generate the laser beam with wavelength $\lambda 2$ that passes through the collimator lens and aperture filter, and is incident on the object lens as parallel light.

Furthermore, an optical disk device according to another embodiment of the present invention includes the above-described optical head, wherein the 1 object lens is configured to focus the laser beam with wavelength $\lambda 1$ on an information recording surface of a first recording medium, and the object lens is configured to focus the laser beam with a wave length of $\lambda 2$ on an information recording surface of a second recording medium, which is thinner than the first recording medium.

Furthermore, an optical head according to another embodiment of the present invention includes a first laser diode configured to generate a laser beam with a wave length $\lambda 1$, a second laser diode configured to generate a laser beam with a wavelength $\lambda 2$, which is shorter than the wavelength $\lambda 1$, a third laser diode configured to generate a laser beam with a wavelength of $\lambda 3$, which is shorter than the wavelength $\lambda 2$, a collimator lens, having an optical axis, the first laser diode and the second laser diode are configured to generate laser beams incident on the collimator lens, and an object lens arranged on the optical axis of the collimator lens, wherein the second laser diode and the third laser diode are arranged at substantially same positions on the optical axis, which are further away from the collimator lens than the first laser diode is away from the collimator lens.

Furthermore, the optical head may include an aperture filter arranged on the optical axis of the collimator lens, wherein the object lens is a diffraction type object lens, wherein the first laser diode is configured to generate the laser beam with wavelength $\lambda 1$ such that the laser-beam with wavelength $\lambda 1$ passes through the collimator lens and the aperture filter, and is incident on the object lens as a diffused light, and the second laser diode is configured to emit the laser beam with wavelength $\lambda 2$ and the third laser diode is configured to emit the laser beam with wavelength of $\lambda 3$ such that the laser beams with wavelengths $\lambda 2$ and $\lambda 3$ pass through the object lens and the aperture filter, and are incident on the object lens as parallel light.

Furthermore, the optical disk device according to another embodiment of the present invention includes the optical head described above, wherein the diffraction type object lens is configured to focus the laser beam with wavelength λ1 on an information recording surface of a first recording medium, the diffraction type object lens is configured to focus the laser beam with wavelength λ2 on an information recording surface of a second recording medium, in which a distance between a surface of the second recording medium and the information recording surface of the second recording medium is smaller than a distance between a surface of the first recording medium and the information recording surface of the first recording medium, and the diffraction type object lens is configured to focus the laser beam with wavelength λ3 on an information recording surface of a third recording medium, in which a distance between a surface of the third recording medium and the information recording surface of the third recording medium is substantially equal to the distance between the surface of the second recording medium and the information recording surface second medium.

According to the optical head described, an inexpensive and small optical head can be provided.

BRIEF DESCRIPTION OF THE DRAWINGS

A more complete appreciation of the embodiments of the present invention, and many of the attendant advantages thereof, will be readily obtained as the same becomes better understood by reference to the following detailed description, when considered in connection with the accompanying drawings, wherein.

DETAILED DESCRIPTION OF PREFERRED EMBODIMENTS

Hereinafter, embodiments of the present invention will be explained in detail with reference to the accompanying drawings.

Figure 1:
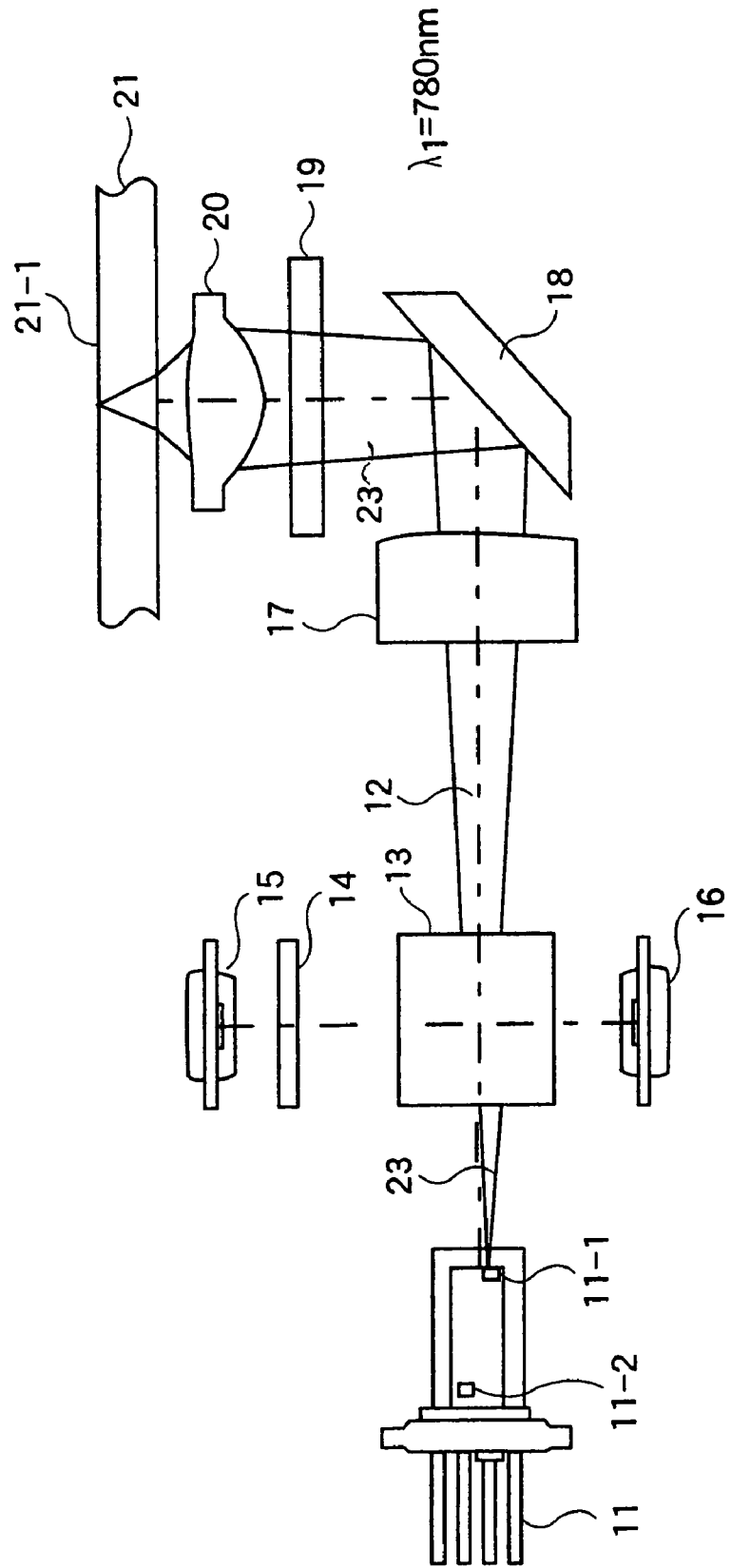
FIG. 1 is a plan view showing a whole structure of the optical head according to an embodiment of the present invention.

FIG. 1 is a plan view showing a whole structure of the optical head according to an embodiment of the present invention. In the drawing, a light source 11 is a two-wavelength frame diode, in which two laser diodes generating laser beams with different wavelengths of λ1 and λ2, for example, 780 nm and 660 nm, are mounted on the same frame. In the light source 11, a first laser diode 11-1 for generating the laser beam with a wave length of λ1 and a second laser diode 11-2 for generating the laser beam with a wave length of λ2 are arranged to be spaced apart from each other in the direction of an optical axis 12 indicated by a chain line. On the optical axis 12, a beam splitter 13 is arranged and a data servo PD (photodiode) 15 is arranged on one side of the beam splitter 13 via a phase plate 14. On the other side of the beam splitter 13, a photo diode PD 16, configured to emit a quantity of light, is arranged.

On the right side of the light source 11, as shown in FIG. 1, beam splitter 13, a collimator lens 17, and a reflection mirror 18 are arranged on optical axis 12. The reflection mirror 18 turns the optical axis 12 substantially at a right angle and an object lens 20 is arranged via an aperture filter 19 on the optical axis 12, which is also turned at a right angle. The object lens 20 is a limited aperture type double focus lens, which is a spherical aberration correction lens composed of a nonspherical convexity on one side and a flat convexity on the other side. The aperture filter 19 is, for example, a dichroic filter for limiting the aperture of the object lens 20 for the laser beam with a wave length of λ1 and for not limiting the aperture of the object lens 20 for the laser beam with a wave length of λ2.

On the opposite side of the object lens 20 to the aperture filter 19, a first recording medium 21, a CD with a thickness of 1.2 mm, for example, is arranged. In the neighborhood of a surface of the first recording medium 21 on the opposite side of the object lens 20, an information recording surface 21-1 is formed, wherein a recording signal for CD is recorded in a form of a concavo-convex surface or of a mark space.

Figure 2:
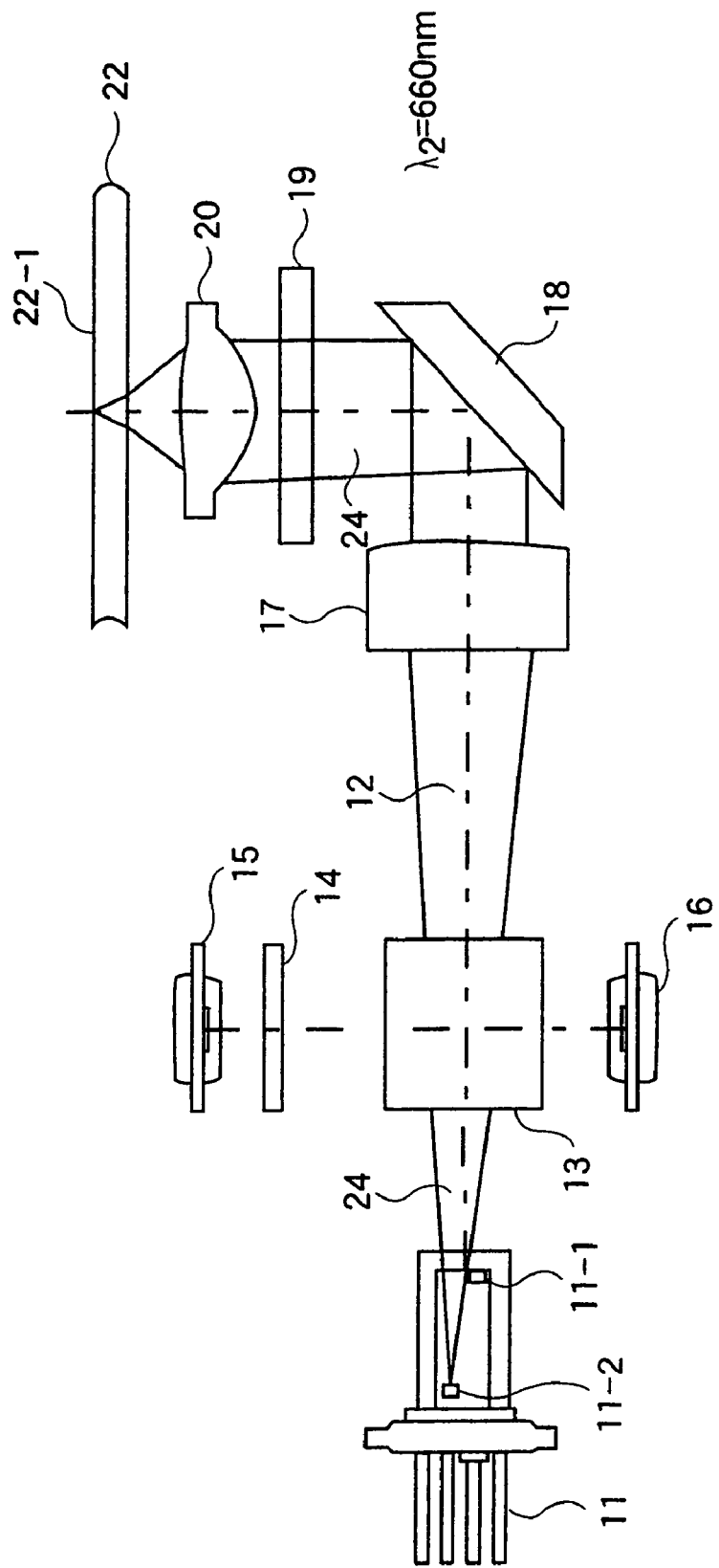
FIG. 2 is another plan view showing a whole structure of the optical head according to an embodiment of the present invention.

FIG. 2 is another plan view showing a whole structure of the optical head according to the embodiment of the present invention, in which the same numerals are assigned to the same components as those shown in FIG. 1. In a whole structure of the optical head shown in the drawing, only a second recording medium 22 is different from the whole structure of the optical head shown in FIG. 1. Namely, the second recording medium 22, for example, is a DVD recording medium composed of two substrates with a thickness of 0.6 mm, which are laminated together. However, in FIG. 2, only the substrate among the two laminated substrates on the side of the object lens 20 is shown and the other one is omitted to clearly distinguish the DVD from the CD. On the substrate on the side of the object lens 20, an information-recording surface 22-1 is formed in the neighborhood of the surface thereof away from the object lens 20, wherein a recording signal for the DVD is recorded in the form of a concavo-convex surface or of a mark space.

A more detailed description of a positional relationship between the first laser diode 11-1 and the second laser diode 11-2 in the light source 11 follows.

As shown in FIG. 1, the first laser diode 11-1 of the light source 11 is arranged in a position, where a laser beam 23 with a wave length of λ1 is emitted from the first laser diode 11-1. Laser beam 23 is diffused light even after it passes through the collimator lens 17, as shown in FIG. 1. The first recording medium 21 is arranged in a position, where the laser beam 23 is focused on the information recording surface 21-1 in the first recording medium 21 by the object lens 20.

As shown in FIG. 2, the second laser diode 11-2 of the light source 11 is arranged in a position, where a laser beam 24 with a wave length of λ2 is emitted from the second laser diode 11-2 becomes parallel light after it passed through the collimator lens 17. The second recording medium 22 is arranged in a position, where the laser beam 24 is focused on the information recording surface 22-1 in the second recording medium 22 by the object lens 20.

As described above, the substrate of the first recording medium 21 is thicker than the substrate of the second recording medium 22. Thus, the laser beam 23 passing through the same object lens 20 is focused at a position further from the object lens 20 than the position at which the laser beam 24 is focused from the object lens 20, as shown in FIGS. 1 and 2.

To realize such a focusing relationship, the second laser diode 11-2 is located at a position further away from the collimator lens 17 than the first laser diode 11-1 is from the collimator lens 17, on the optical axis 12.

The operation of the optical head having a structure according to an embodiment of the present invention will be explained below.

Initially, when recording and reproducing are made using the first recording medium 21, for example, the CD recording medium, the first laser diode 11-1 in the light source 11 is put into operation and a laser beam with a wave length of λ1 is emitted, as shown in FIG. 1. The laser beam 23 travels along the optical axis 12 and is incident on the collimator lens 17 via the beam splitter 13. However, the laser beam 23 is not converted into a parallel light here, but is output as a diffused light. The laser beam 23 is bent at right angles by the reflection mirror 18 and is incident on the object lens 20 via the aperture filter 19 arranged on the optical axis 12, which is also bent at a substantially right angle. Here, the aperture filter 19 controls its aperture to limit an aperture of the lens, through which the laser beam 23 passes. Namely, in a case of the CD, a numerical aperture (NA) of the object lens is controlled to be in the range from 0.45 to 0.55. In a case of the DVD, on the other hand, the numerical aperture (NA) of the object lens is 0.6 or larger. Thus, the aperture is controlled to be an appropriate value, according to the respective mediums, by the aperture filter 19. The laser beam 23 incident on the object lens 20, the aperture of which is thus controlled, is focused on the information recording surface 21-1 of the first recording medium 21 by the object lens 20.

Next, when recording and reproducing are made using the second recording medium 22, for example, a DVD recording medium, as shown in FIG. 2, the second laser diode 11-2 in the light source 11 is put into operation and a laser beam with a wave length of λ2 is emitted. The laser beam 24 travels along the optical axis 12 and is incident on the collimator lens 17 via the beam splitter 13. Here, the laser beam 24 is converted into parallel light. The laser beam 24 converted into parallel light is bent at a substantially right angle by the reflection mirror 18 and is incident on the object lens 20 via the aperture filter 19 arranged on the optical axis 12, which is similarly bent at a substantially right angle. Here, the aperture filter 19 is not controlled to limit its aperture, so that the laser beam 24 is controlled so as to pass through the whole aperture of the lens. The laser beam 24 incident on the object lens 20, the aperture of which is thus not limited, is focused on the information recording surface 22-1 of the second recording medium 22 by the object lens 20.

Figure 3:
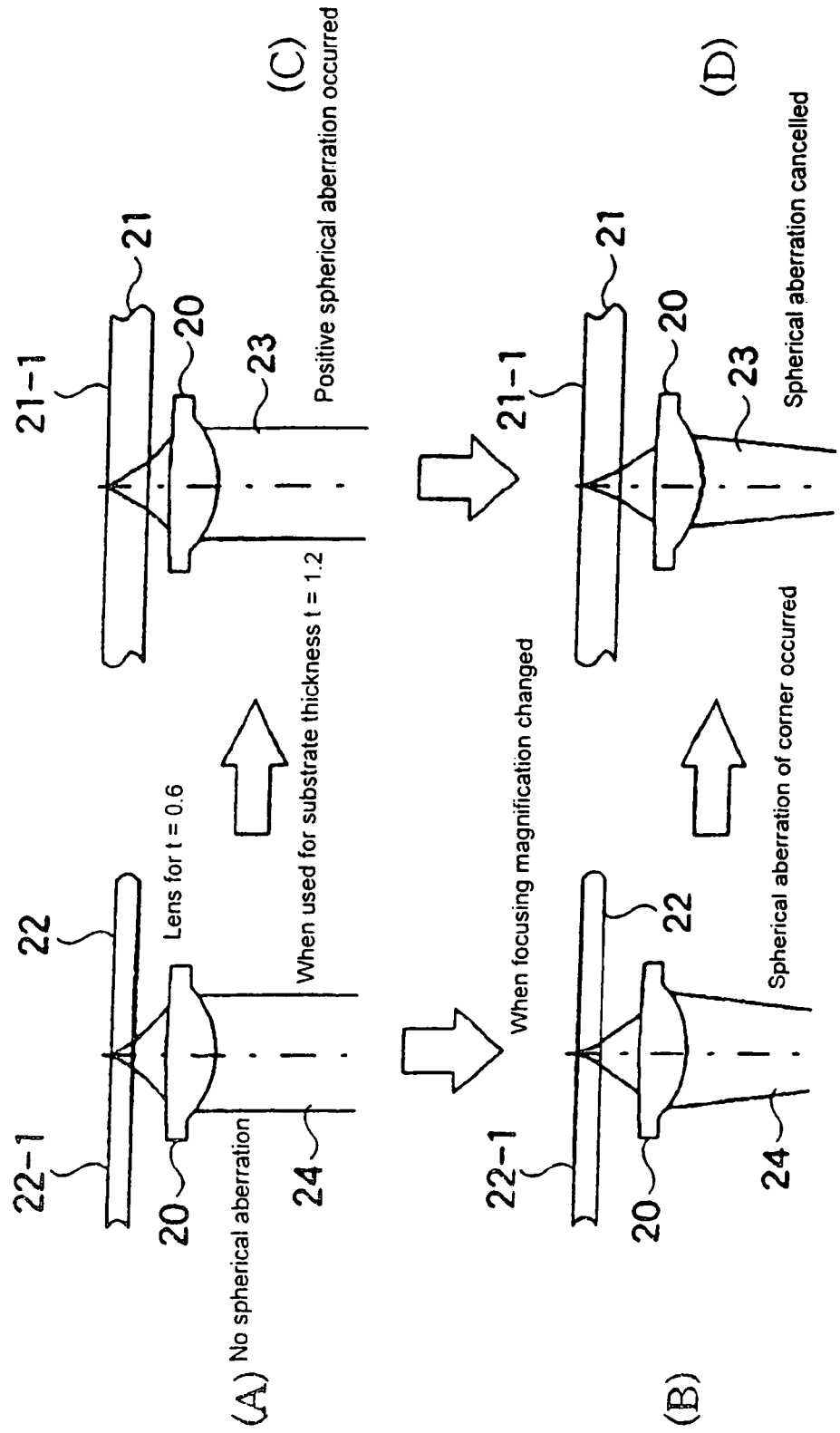
FIGS. 3A-D are schematic views of a portion of the optical head for explaining correction principle of the spherical aberration of the optical head according to an embodiment of the present invention.

According to the optical head having such structure, there is no need to use an expensive diffraction object lens. Rather, an inexpensive object lens such as a flat convex spherical aberration correction lens, for example, can be used. Particularly, according to the optical head described above, the spherical aberration of the laser beam 23 emitted from the first laser diode 11-1 and the laser beam 24 emitted from the second laser diode 11-2, caused by the difference in thickness between the first recording medium 21 and the second recording medium 22, can be corrected by the flat convex spherical aberration correction lens. This will be further explained by reference to FIG. 3.

FIGS. 3(A) and 3(B) are schematic views respectively showing the relationship of the optical positions between the object lens 20 and the second recording medium 22. FIG. 3(A) shows that laser beam 24, with a wavelength of λ2, is incident on the object lens 20 as parallel light. Laser beam 24 is focused on the information recording surface 22-1 of the second recording medium 22, which is a DVD recording medium, by the object lens 20. The object lens 20 is designed to prevent a spherical aberration by the laser beam 24 in this state. On the other hand, FIG. 3(B) shows a state where laser beam 24, with a wavelength of λ2, is incident on the object lens 20 and is converted into diffused light instead of parallel light because the focusing magnification of the collimator lens 17 is changed, for example. Laser beam 24 is focused on the information recording surface 22-1 of the second recording medium 22. In this state, a negative spherical aberration occurs because of the object lens 20.

On the other hand, FIGS. 3(C) and 3(D) are schematic views respectively showing the relationship of the optical position between the object lens 20 and the first recording medium 21. FIG. 3(C) shows that the laser beam 23, with a wave length of λ1, is incident on the object lens 20 as parallel light and that the laser beam 23 is focused on the information recording surface 21-1 of the first recording medium 21, which is a CD recording medium, by the object lens 20. In this state, the distance up to the focusing point is longer than that in the case shown in FIG. 3(A) due to the difference in the substrate thickness of the CD recording medium and that of the DVD recording medium. Thus, a positive spherical aberration occurs because of the object lens 20.

On the other hand, FIG. 3(D), similar to the case shown in FIG. 3(B), shows a state where the laser beam 23, incident on the object lens 20, is converted into diffused light instead of the parallel light by changing the focusing magnification of the collimator lens 17 shown in FIG. 1, for example. Laser beam 23 is then focused on the information recording surface 21-1 of the first recording medium 21. In this state, the spherical aberration by the object lens 20 is offset.

As described above, two laser beams with different wave lengths incident on the same object lens 20 can be focused on two different positions on the optical axis without the spherical aberrations by converting one of the laser beams into parallel light and by converting the other laser beam into diffused light.

In the embodiment of the present invention, as described above, the focusing relationship is thus realized by locating the second laser diode 11-2 at a position further away from the collimator lens 17 on the optical axis 12 than the first laser diode 11-1 is away from the collimator lens 17. For example, the second laser diode 11-2 is located further away from the collimator lens 17 than the first laser diode 11-1 is located away from the collimator lens 17 by about 1/100 of the distance between where the first laser diode 11-1 is located and the collimator lens 17 is located.

Therefore, according to the embodiment of the present invention, a light source 11 for generating two laser beams with different wave lengths is provided, in which the first and second light emitting diodes 11-1 and 11-2 are mounted on the same frame but at the different positions so that the light emitting sources are shifted in the direction of the optical axis. Thus, the spherical aberrations are corrected and an inexpensive object lens can be used.

Figure 4:
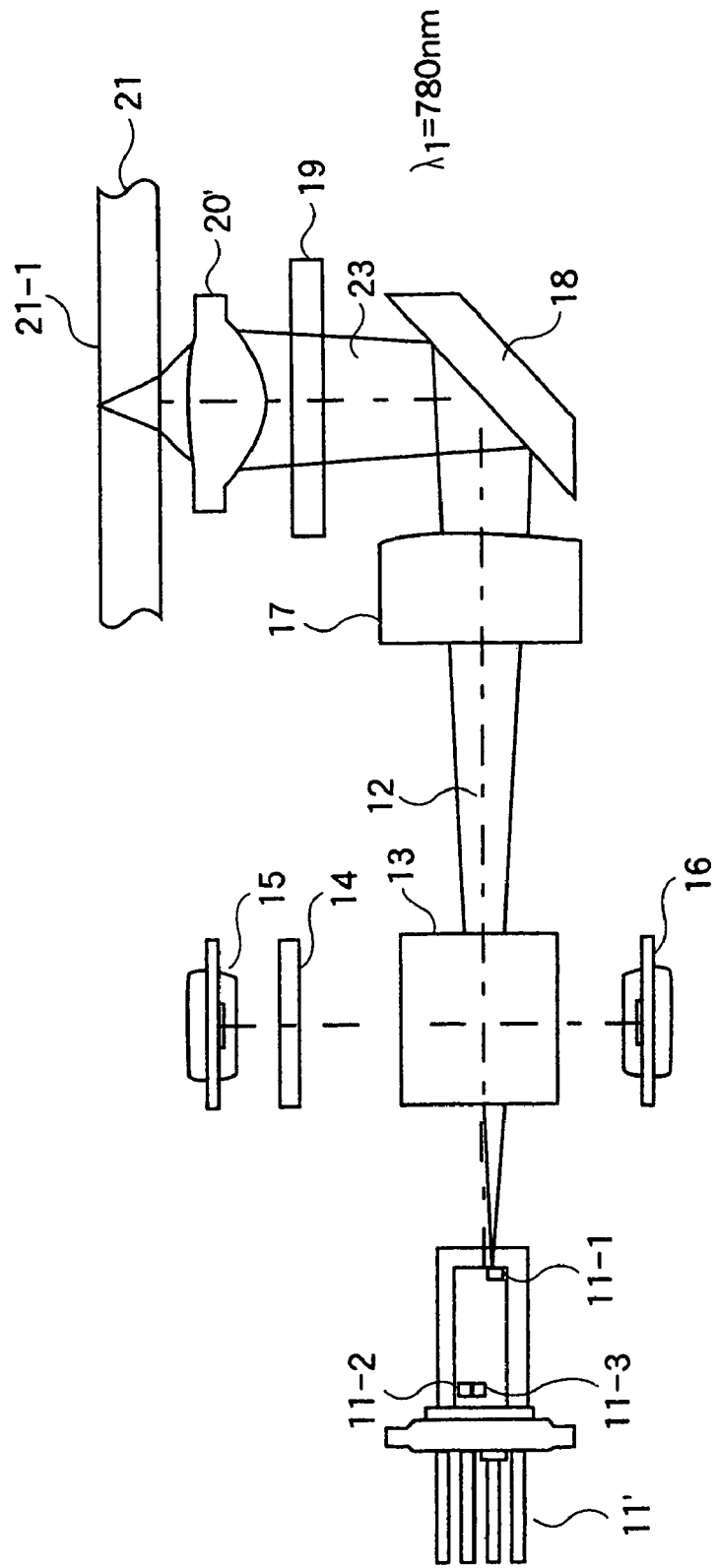
FIG. 4 is a plan view showing a whole structure of the optical head according to another embodiment of the present invention.
Figure 5:
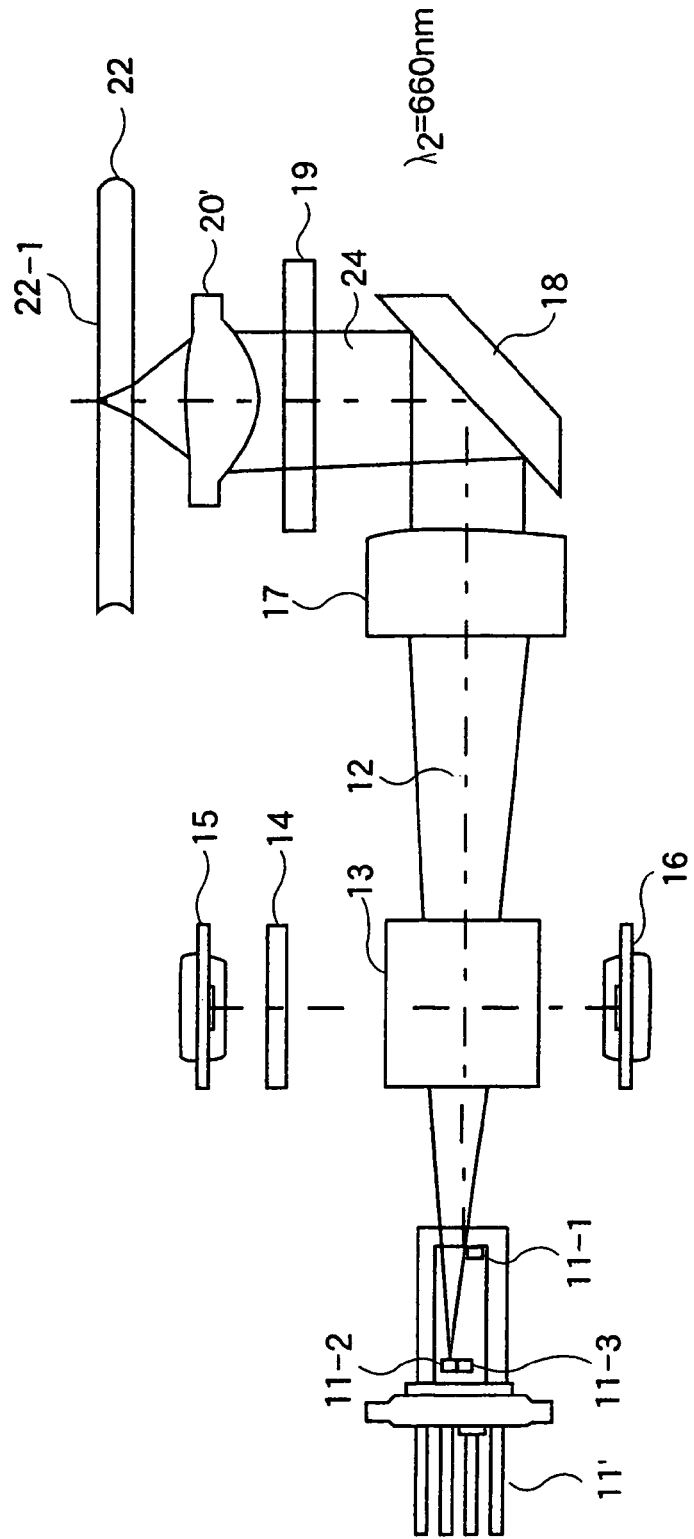
FIG. 5 is a plan view showing a whole structure of the optical head according to still another embodiment of the present invention.

FIGS. 4 and 5 are plan views showing the optical head according other embodiments of the present invention. In the drawings, the same numerals or dashed lines are assigned to represent same or similar parts as those shown in FIG. 1 or 2. The details thereof are thus omitted and only the different parts will be explained. In this embodiment, laser beams with different wavelengths of λ1, λ2, and λ3 are used. λ3 is, for example, 405 nm, which corresponds to a blue light; the wave length of which is shorter than both λ1 and λ2.

In this embodiment, in a light source 11', a third light emitting diode 11-3 with a wave length of λ3 is mounted on the same frame in addition to the first light emitting diode 11-1 with a wave length of λ1 and the second light emitting diode 11-2 with a wave length of λ2, which are shown in FIGS. 1 and 2. Here, the wave lengths are exemplarily defined as follows: λ1 is 780 nm, which is infrared light; λ2 is 660 nm, which is red light; and λ3 is 405 nm, which is blue light. Furthermore, the positional relationship on the optical axis 12 between the first light emitting diode 11-1 and the second light emitting diode 11-2 is the same as that shown in FIG. 1 or 2. However, the third light emitting diode 11-3 is located at a same position as that of the second light emitting diode 11-2 on the optical axis 12. Therefore, the second light emitting diode 11-2 and the third light emitting diode 11-3 are shifted with respect to the position of the first light emitting diode 11-1 in the direction of the optical axis.

Next, a diffraction object lens is used as an object lens 20' in this embodiment. An annular diffraction structure (not drawn) is formed on one surface of the object lens 20', which is provided on the side of the aperture filter 19 shown in FIG. 1 or 2.

Further, the second recording medium 22 shown in FIG. 5 is, for example, the DVD recording medium as shown in FIG. 2.

The operation of the optical head having such a constitution will be explained below.

The operation is basically the same as that shown in FIG. 1, when recording and reproducing using the first recording medium 21, a CD recording medium, for example. Namely, as shown in FIG. 4, the first laser diode 11-1 of the light source 11' is put into operation and a laser beam with a wave length of λ1 is emitted. The laser beam 23 travels along the optical axis 12 and is incident on the collimator lens 17 via the beam splitter 13. The laser beam 23 is converted into diffused light here. The laser beam 23 converted to the diffused light is bent at a substantially right angle by the reflection mirror 18 and is incident on the object lens 20' via the aperture filter 19 arranged on the optical axis 12, which is similarly bent at a substantially right angle. Here, the aperture filter 19 is controlled to limit the aperture of the object lens 20', through which the laser beam 23 passes. The laser beam 23 incident on the object lens 20', the aperture of which is thus limited, is focused on the information recording surface 21-1 of the first recording medium 21 by the object lens 20'. Further, the object lens 20' is a diffraction lens having a structure, which does not affect the laser beam with a wave length of λ1, 780 nm, for example. The object lens 20' thus acts as an ordinary nonspherical convex lens shown in FIG. 1. Therefore, the laser beam 23 is focused on the information recording surface 21-1 of the first recording medium 21, in a similar manner to the operation shown in FIG. 1.

The operation of the embodiment of the present invention shown in FIG. 4 is basically the same as that shown in FIG. 2, when recording and reproducing using the second recording medium 22, a DVD recording medium, for example. Namely, the second laser diode 11-2 of the light source 11' is put into operation and a laser beam with a wave length of λ2 is emitted as shown in FIG. 5. The laser beam 24 travels along the optical axis 12 and is incident on the collimator lens 17 via the beam splitter 13. The laser beam 24 is converted into the parallel light here. The laser beam 24 which is converted into parallel light is bent at a substantially right angle by the reflection mirror 18 and is incident on the object lens 20' via the aperture filter 19 arranged on the optical axis 12, which is similarly bent at a substantially right angle. Here, the aperture filter 19 is not controlled to limit its aperture and thus the laser beam 24 passes through the whole aperture of the lens 20'. The laser beam 24, which is incident on the object lens 20', the aperture of which is thus not limited, is focused on the information recording surface 22-1 of the second recording medium 22 by the object lens 20'.

Here, the object lens 20' is a diffraction lens, the structure of which does not affect the laser beam with a wave length of λ2, 660 nm for example. The object lens 20' thus acts as an ordinary nonspherical convex lens as shown in FIG. 2. Therefore, the laser beam 24 is focused on the surface 22-1 of the second recording medium 22, in the similar manner to the operation shown in FIG. 2.

Figure 6:
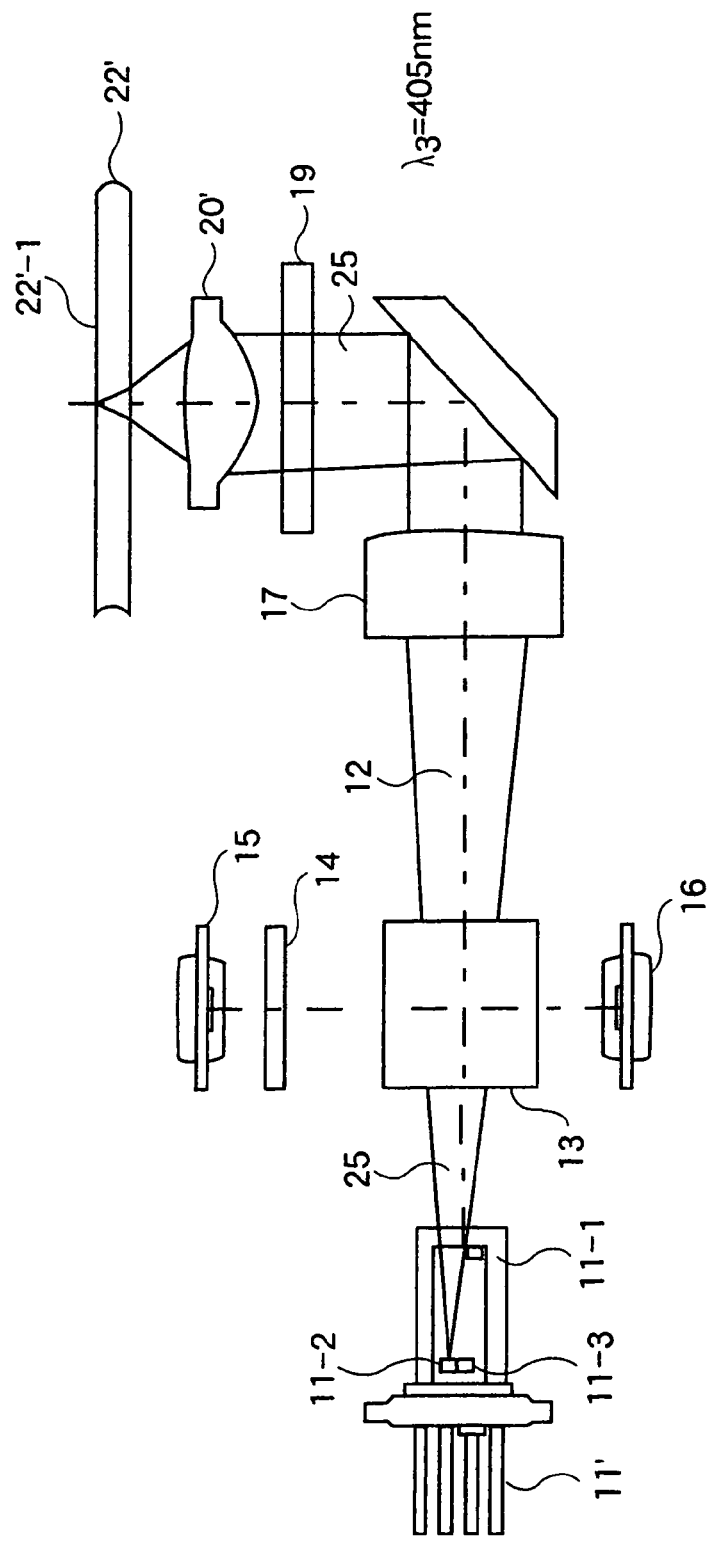
FIG. 6 is a plan view showing a whole structure of the optical head according to another embodiment of the present invention.

The third laser diode 11-3 in the light source 11' is put into operation and a laser beam with a wave length of λ3 is emitted, when recording and reproducing using a third recording medium 22', a high-density DVD, for example. The high-density DVD is an HDDVD recording medium having the same substrate with a thickness of 0.6 mm as that of the DVD recording medium, as shown in FIG. 6. The laser beam 25 travels along the optical axis 12 and is incident on the collimator lens 17 via the beam splitter 13. The laser beam 25 is converted into the parallel light here. The laser beam 25, which is converted into the parallel light, is bent at a substantially right angle by the reflection mirror 18 and is incident on the object lens 20' via the aperture filter 19 arranged on the optical axis 12, which is similarly bent at a substantially right angle. Here, the aperture filter 19 is not limited in its aperture and the laser beam 25 passes through the whole aperture of the lens. The laser beam 25 incident on the object lens 20', the aperture of which is thus not limited is focused on the surface 22'-1 of the third recording medium 22' by the object lens 20'.

Here, the object lens 20' is a diffraction lens having a structure, which acts as a lens with a different focal length from that of the ordinary nonspherical convex lens shown in FIG. 1 or 2, for a laser beam with a wave length of λ3, 405 nm, for example. Particularly, in the ordinary nonspherical convex lens shown in FIG. 1 or 2, the laser beam with a wave length of λ3 has a different focal length from that of the laser beam with a wave length of λ2. Therefore, for the laser beam with a wave length of λ3, the focal length is corrected by the diffraction structure having a wave length selective property. Thus, the laser beam 25 converted into the parallel light is focused on the surface 22'-1 of the third recording medium 22'.

According to this embodiment, three kinds of recording media, such as CD, DVD, and HDDVD recording media can be recorded and reproduced by a small and inexpensive common optical head using laser beams with three different wave lengths.

Numerous modifications and variations of the present invention are possible in light of the above-teachings. It is therefore to be understood that within the scope of the appended claims, the invention may be practiced otherwise that as specifically described herein.

The invention claimed is:

1. An optical head having at least three laser diodes each generating a laser beam with a different wave length from each other, the optical head comprising:
    a first laser diode for generating a laser beam with a wave length of λ1;
    a second laser diode arranged on the same optical axis as the first laser diode and at a further position than the first laser diode from an information-recording surface for generating a laser beam with a wave length of λ2, which is shorter than the wave length of λ1;
    a third laser diode arranged on the same optical axis as the first laser diode for generating a laser beam with a wave length of λ3, which is shorter than the wave length λ2;

a collimator lens arranged at a position where a diffused light is output there from when the laser beam with the wave length λ1 is incident, and a parallel light is output there from when the laser beams with the wave lengths λ2 and λ3 are incident;

a diffraction object lens arranged on the optical axis of the collimator lens; and an aperture filter arranged between the collimator lens and the diffraction object lens for limiting the aperture for the laser beam of the first laser diode with the wave length λ1, wherein the second and the third laser diodes are arranged at substantially same positions on the optical axis, which are farther than the first laser diode from the collimator lens, wherein the laser beam with the wave length λ1 generated by the first laser diode is focused on an information recording surface of a first recording medium via the diffraction object lens, wherein the laser beam with the wave length λ2 generated by the second laser diode is focused on an information recording surface of a second recording medium which has a shorter distance between the recording medium surface and the information recording surface than the distance between a recording medium surface and the information recording surface of the first recording medium via the diffraction object lens, and wherein the laser beam with the wave length λ3 generated by the third laser diode is focused on an information recording surface of a third recording medium which has substantially equal distance between a recording medium surface and the information recording surface to the distance between the recording medium surface and the information recording surface of the second recording medium via the diffraction object lens.

* * * * *